June 18, 1968     C. L. WILSON     3,388,924
LOAD EQUALIZER
Filed June 8, 1966
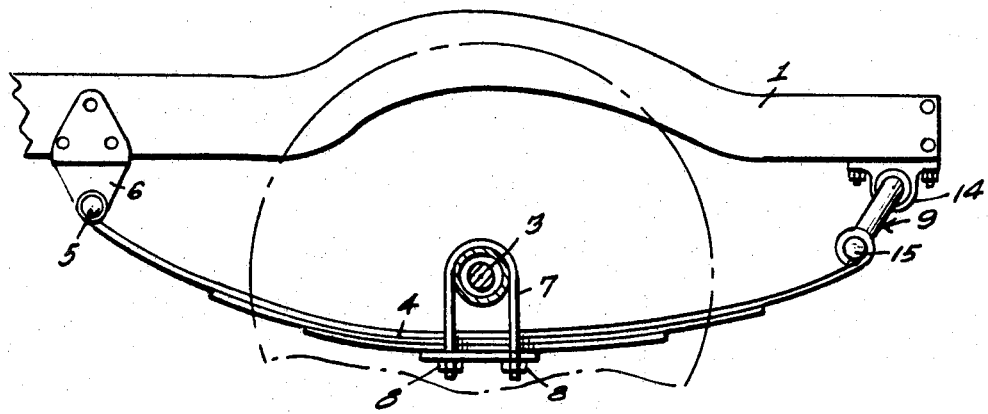
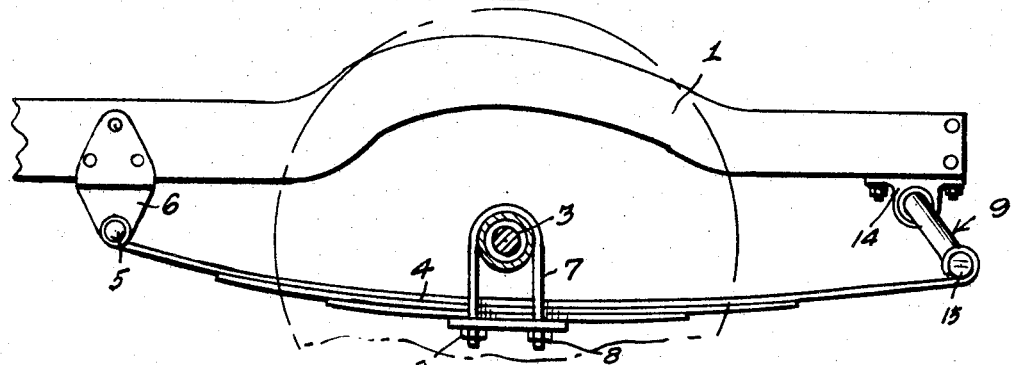
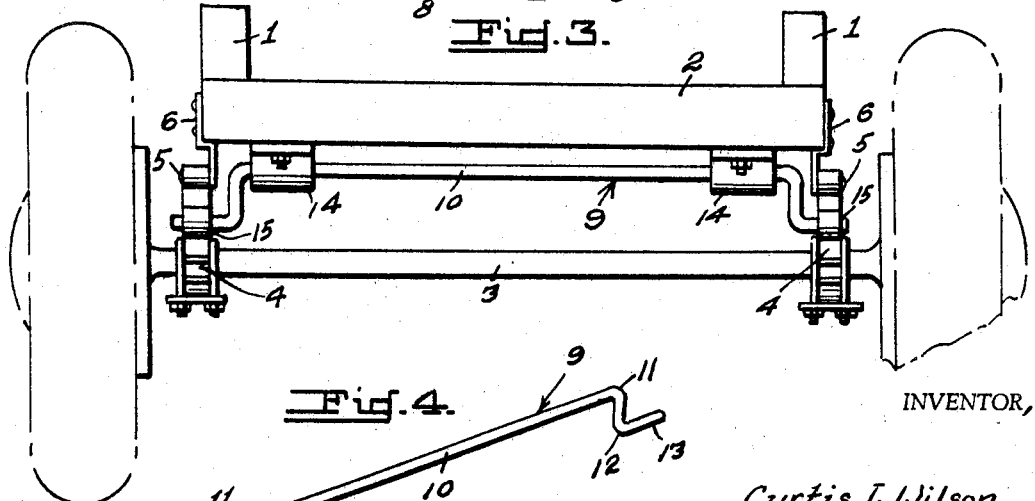
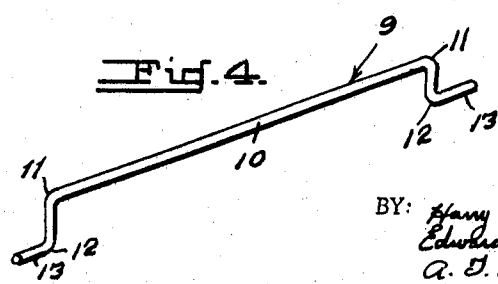
INVENTOR,
Curtis L. Wilson
BY: Harry M. Saragovitz,
Edward J. Kelly &
A. D. Dupont
ATTORNEYS.

United States Patent Office 3,388,924
Patented June 18, 1968

3,388,924
LOAD EQUALIZER
Curtis L. Wilson, 3103 Elizabeth, Space 25,
Pueblo, Colo. 81003
Filed June 8, 1966, Ser. No. 556,832
1 Claim. (Cl. 280—124)

ABSTRACT OF THE DISCLOSURE

A load equalizer for a vehicle having leaf spring suspension consisting of a continuous bar pivotally mounted transversely of the vehicle's frame and connected at each of its ends to a free end of one of the leaf springs whereby the load will be transferred from one spring to the other when the vehicle is rounding a curve or travelling on an uneven surface to reduce tilting of the vehicle's body.

---

The invention described herein may be manufactured and used by or for the Government for governmental purposes, without the payment to me of any royalty thereon.

This invention relates to a load equalizer and more particularly to a load equalizer for use on vehicles having leaf spring suspension.

Leaf spring suspension does not provide stability to a vehicle, and unless sway bars and shackles are used in addition to the leaf springs, the vehicle is subject to sway when rounding curves, riding rough roads and when unevenly loaded.

The present invention is designed to eliminate sway bars and spring shackles and at the same time afford a greater stability for the vehicle.

It is a primary object of this invention to provide a means of reducing side sway of a vehicle due to curves, rough roads and uneven loading.

Another object is to provide a one piece member which is connected to the body of a vehicle and the ends of the vehicle's leaf springs whereby spring shackles and extra sway bars may be eliminated.

A further object is to transfer the load on one spring of a vehicle to another spring on the opposite side to balance the body.

A still further object is to provide a load equalizer for a vehicle that is of one piece construction.

These and other objects and advantages of the present invention will be fully apparent from the following description when taken in connection with the annexed drawing, in which:

FIG. 1 is a partial side elevation of the rear end of a vehicle chassis frame and leaf suspension spring and with the load equalizer of this invention mounted thereon, the spring being in normal, undepressed position;

FIG. 2 is a similar view, the spring being depressed, as with a load or the vehicle rounding a curve;

FIG. 3 is a rear view of the vehicle frame and showing the load equalizer attached at both of its ends to the springs; and, FIG. 4 is a perspective view, on a smaller scale, of the load equalizer per se.

Referring in detail to the drawing in which reference character 1 indicates rearward portions of the side channel members of a vehicle frame and 2 denotes a cross member.

3 indicates the rear axle of the vehicle and 4 designated leaf springs which are attached at their forward ends as at 5 to brackets 6 which are, in turn, attached to the side channels 1, as shown.

Springs 4 are supported at their medial points to axle 3 by U-straps 7 and nuts 8 as is usual construction.

The load equalizer of the invention is illustrated in FIG. 4 and is generally indicated by 9 and consists of a straight portion 10 which is bent downwardly at each end at right angles as at 11, and inwardly at right angles as at 12, to form axial portions 13.

At least two bearing brackets 14 are mounted on the underside of member 2 and support the load equalizer 9 rotatably therein.

Axle portions 13 are rotatably mounted to the rearward springs 4 as at 15 and suitable bearings, bushings, etc., may be applied at mountings 5 and 15 as expedient.

The operation of the load equalizer is simple. Assuming the vehicle is rounding a curve. The spring on the outside of the curve will become depressed and cause the load equalizer to change its angle and transmit the same amount of depression to the spring on the inside of the curve, thus maintaining the vehicle in a level position.

The same action occurs if the vehicle is unevenly loaded.

The change of angle of the equalizer is shown in FIGS. 1 and 2.

It is apparent that the load equalizer will operate under all conditions, such as when the vehicle is running on the side of a hill, bumpy roads and unevenly placed loads.

While only a preferred form of the invention is shown and described,, other forms of the invention are contemplated and numerous changes and modifications may be made therein without departing from the spirit of the invention as set forth in the appended claim.

What is claimed is:

1. In combination with a vehicle including a pair of longitudinally disposed leaf springs pivotally mounted at one of their ends to said frame, and an axle mounted transversely to said springs; a load equalizer rotatably mounted on said frame and pivotally mounted to the free ends of said springs, said load equalizer comprising a continuous rod, said rod being bent at its end portions, first downwardly in a vertical direction, then horizontally outward, the horizontal portions forming trunnions for pivotal engagement with the free ends of said leaf springs whereby when one spring is depressed, the motion will be transmitted by said rod to the other spring.

References Cited

UNITED STATES PATENTS

| 2,753,007 | 7/1956 | Read | 280—124 X |
| 2,917,304 | 12/1959 | Nilsson | 267—25 X |
| 2,068,676 | 1/1937 | Hickman | 267—27 |
| 462,873 | 11/1891 | Gunn | 267—25 |

PHILIP GOODMAN, *Primary Examiner.*